(12) United States Patent
Fan et al.

(10) Patent No.: US 7,295,858 B2
(45) Date of Patent: Nov. 13, 2007

(54) MOBILE STATION CAPABLE OF OUTPUTTING RING TONES COMING FROM A BASE STATION WITHOUT STORING THEM LOCALLY ON THE MOBILE STATION

(75) Inventors: Chen-Huang Fan, Miaoli (TW); Ben-Chuan Du, Taipei Hsien (TW); Yi-Wen Cheng, Taipei (TW)

(73) Assignee: Benq Corporation, Taoyuan (TW)

( * ) Notice: Subject to any disclaimer, the term of this patent is extended or adjusted under 35 U.S.C. 154(b) by 171 days.

(21) Appl. No.: 10/911,985

(22) Filed: Aug. 5, 2004

(65) Prior Publication Data
US 2005/0119033 A1   Jun. 2, 2005

(30) Foreign Application Priority Data
Aug. 5, 2003 (TW) .............................. 92121348 A

(51) Int. Cl.
*H04M 1/00* (2006.01)
(52) U.S. Cl. .................. 455/550.1; 455/420; 455/419; 455/567; 455/70
(58) Field of Classification Search ................ 455/420, 455/419, 567, 70
See application file for complete search history.

(56) References Cited

U.S. PATENT DOCUMENTS

| | | | |
|---|---|---|---|
| 6,094,587 A * | 7/2000 | Armanto et al. ............. | 455/567 |
| 6,418,330 B1 * | 7/2002 | Lee ............................. | 455/567 |
| 2001/0016483 A1 * | 8/2001 | Nakajima ..................... | 455/406 |
| 2002/0107009 A1 * | 8/2002 | Kraft et al. .................. | 455/417 |
| 2002/0111171 A1 * | 8/2002 | Boesch et al. ................ | 455/456 |
| 2003/0109251 A1 * | 6/2003 | Fujito et al. ................. | 455/414 |
| 2004/0033798 A1 * | 2/2004 | Robin et al. ................. | 455/419 |
| 2004/0121818 A1 * | 6/2004 | Paakkonen ................... | 455/567 |
| 2004/0198471 A1 * | 10/2004 | Deeds ....................... | 455/575.1 |
| 2004/0219953 A1 * | 11/2004 | Deeds ......................... | 455/567 |
| 2004/0266401 A1 * | 12/2004 | Krishnan .................. | 455/412.2 |

* cited by examiner

*Primary Examiner*—Lester G. Kincaid
*Assistant Examiner*—Sayed T. Zewari
(74) *Attorney, Agent, or Firm*—Thomas, Kayden, Horstemeyer & Risley

(57) ABSTRACT

A device for ring tone output. The device comprises a phone speaker, a ringing speaker, a receiver, a switching device and a micro-controller. The receiver acquires audio data via a traffic channel. The audio data comprises a ring tone. The switching device receives the ring tone and selectively transmits the ring tone to the phone speaker and the ringing speaker. The micro-controller directs the switching device to transmit the ring tone to the ringing speaker.

19 Claims, 2 Drawing Sheets

MOBILE STATION CAPABLE OF OUTPUTTING RING TONES COMING FROM A BASE STATION WITHOUT STORING THEM LOCALLY ON THE MOBILE STATION

BACKGROUND OF THE INVENTION

1. Field of the Invention

The present invention relates to mobile stations, and more particularly, to an apparatus and method for ring tone output.

2. Description of the Related Art

"Cell" is the basic geographic unit of a wireless telephony system. A city or county is divided into smaller cells, each of which is equipped with a low-power radio transmitter/receiver (e.g., a base station system). The cells can vary in size depending on terrain, capacity demands, or other conditions. By controlling the transmission power, the radio frequencies assigned to one cell can be limited to the boundaries of that cell. The base station system comprises a base transceiver station (BTS) and a base station controller (BSC). The BTS handles the radio interface to the mobile station with the radio equipment, such as transceivers and antennas. The BSC provides the control functions, such as handoff, cell configuration data and control of radio frequency (RF) power levels in the BTS, and physical links between a message switching center (MSC) and BTS.

Two types of logical channels, such as a control channel (CCH) and a traffic channel (TCH), have been developed in accordance with telephony communication standards. CCHs are employed for various control signals, such as registration, authentication, call set-up, and the like. Traffic channels are defined in GSM using a 26 multi-frame, or a group of 26 time-division multiple access (TDMA) frames. With 26 frames, 24 are used for traffic channels, 1 is used for a control channel, and the remaining channel is unused.

In order to notify a user an incoming call, mobile stations, such as cellular phones, output audio signals, such as polyphonic ring tones or a harmonic ring tones. Conventionally, all ring tones are stored in a memory device of a mobile station, and output using a melody IC. The melody IC acquires a specific ring tone from the memory device according to configured settings and transmits it to a buzzer or a ringing speaker after receiving an incoming call signal via a control channel. It is noted that all the traffic channels are idle at that time.

Although the conventional mobile station provides adequate ring tone output, a melody IC and additional memory space are required to store and output various ring tones, resulting in extra hardware cost. In view of these limitations, a need exists for an apparatus and method for ring tone output, with reduced hardware cost.

SUMMARY OF THE INVENTION

It is therefore an object of the present invention to provide an apparatus and method for ring tone output, not requiring a melody IC and additional memory space.

According to the invention, an apparatus for ring tone output comprises a phone speaker, a ringing speaker, a receiver, a switching device, a micro-controller and a function key. The apparatus may be a cellular phone or other wireless telephony terminals. The receiver acquires audio data via a traffic channel. The audio data comprises a ring tone. The switching device receives the ring tone and selectively transmits the ring tone to the phone speaker and the ringing speaker. The micro-controller controls the switching device. The switching device transmits the ring tone to the ringing speaker.

The receiver preferably comprises a demodulator, a digital signal processor, a digital-to-analog converter (DAC) and a scratch memory. The demodulator receives the audio data via the traffic channel and demodulates the audio data to digital data. The digital signal processor couples to the demodulator and processes the digital data. The DAC couples to the digital signal processor, receives and converts output of the digital signal processor to the ring tone. The scratch memory couples to the digital signal processor and temporarily stores the output of the digital signal processor. The digital signal processor repeatedly refreshes the digital data in the scratch memory until a press signal from the function key is detected. The digital signal processor additionally erases the digital data of the scratch memory after detecting a signal from the function key. The micro-controller directs the switching device to transmit the ring tone to the phone speaker after detecting a signal from the function key. The micro-controller additionally transmits a connection signal via a control channel after detecting a signal from the function key.

A method for ring tone output in a wireless telephony network comprising a base station system (BSS) and a mobile station, comprises the following steps. The BSS transmits audio data via a traffic channel, and the audio data comprises a ring tone. The mobile station receives the audio data via the traffic channel, transmits the ring tone therein to a ringing speaker. The mobile station additionally completes ring tone transmission after detecting a signal from a function key, and transmits a connection signal to the BSS via a control channel.

A method for ring tone output utilized in a mobile station, comprises the following steps. Audio data comprising a ring tone is received via a traffic channel. The audio data is converted to digital data. The ring tone is acquired from the audio data and transmitted to a ringing speaker of the mobile station. The process additionally completes ring tone transmission and transmits a connection signal to a base station system after detecting a signal from a function key of the mobile station.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
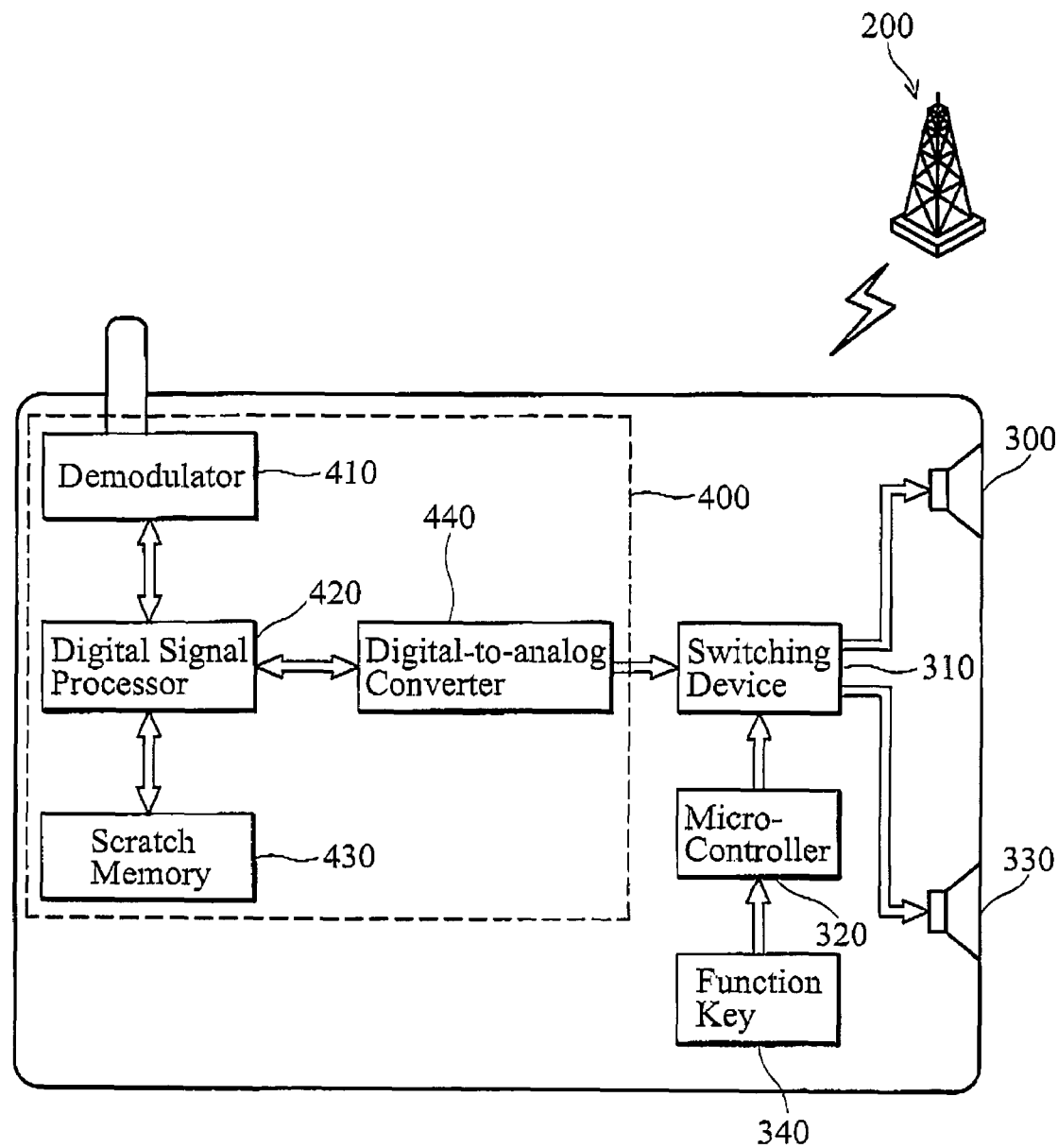
FIG. 1 shows the system architecture for ring tone output according to an embodiment of the invention.

FIG. 1 shows the system architecture for ring tone playing according to an embodiment of the invention. The system comprises a mobile station 100 and a base station system (BSS) 200. The mobile station 100 comprises a phone speaker 330, a ringing speaker 300, a function key 340, a receiver 400, a switching device 310 and a micro-controller 320. The receiver 400 comprises a demodulator 410, a digital signal processor 420, a digital-to-analog converter (DAC) 440, and a scratch memory 430. Preferably, the mobile station is a cellular phone.

The receiver 400 receives audio data via a traffic channel from the BSS 200. The audio data comprises a ring tone, such as a simple ringing tone or a complicated chord melody.

The demodulator 410 demodulates the audio data to digital data, and transmits the digital data to the digital signal processor 420. The digital signal processor 420 stores the digital data to the scratch memory 430 and transmits it to the DAC 440. The digital signal processor 420 repeatedly refreshes the digital data in the scratch memory 430 until a press signal from the function key 340 is detected. The scratch memory 430 temporarily stores output of the digital signal processor 420 and serves as a buffer for analog data conversion. The capacity of the scratch memory 430 depends on the speed of the digital signal processor 420 and the transmission rate between the BSS 200 and the mobile station 100. The DAC 440 converts the digital data from the digital signal processor 420 to analog data.

The micro-controller 320 directs the switching device 310 to transmit the analog data (i.e., the ring tone) from the DAC 440 to the ringing speaker 300 after receiving an incoming call signal from a control channel. In addition, the micro-controller 320 directs the switching device to transmit the analog data from the DAC 440 to the phone speaker 330 after receiving a press signal from the function key 340.

Figure 2:
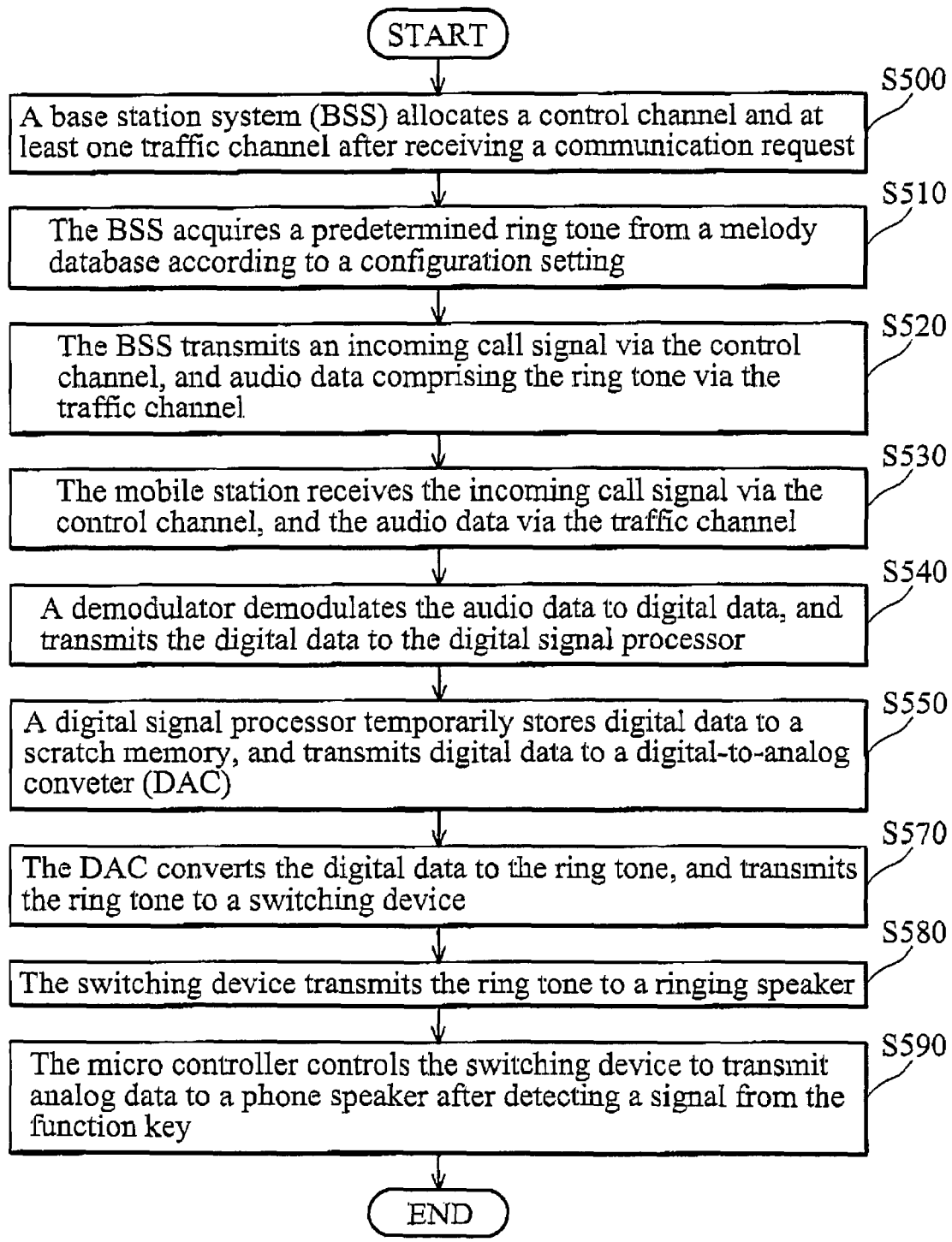
FIG. 2 is a flowchart showing a method of ring tone output according to the embodiment of the invention.

FIG. 2 is a flowchart showing a method of ring tone playing according to the embodiment of the invention. The method is utilized in the disclosed system. In step S500, the BSS 200 allocates a control channel and at least one traffic channel after receiving a communication request. In step S510, the BSS 200 acquires a predetermined ring tone from a melody database according to a configuration setting. In step S520, the BSS 200 transmits an incoming call signal via the control channel, and audio data comprising the ring tone via the traffic channel. In step S530, the mobile station 100 receives the incoming call signal via the control channel, and the audio data via the traffic channel.

In step S540, the demodulator 410 demodulates the audio data to digital data, and transmits the digital data to the digital signal processor 420. In step S550, the digital signal processor 420 stores digital data in the scratch memory 430 temporarily, and transmits digital data to the DAC 440. In step S570, the DAC 440 converts the digital data to the ring tone, and transmits the ring tone to the switching device 310. In step S580, the switching device transmits the ring tone to the ringing speaker 300. In step S590, the micro-controller 320 directs the switching device 310 to transmit analog data to the phone speaker 330 after detecting a press signal from the function key 340.

According to the embodiment of the invention, a mobile station acquires a ring tone via at least one traffic channel from a BSS. Thus, the mobile station eliminates the need for a melody IC and additional memory space, thus reducing hardware costs.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A mobile unit for communicating with a base station, the base station allocating a traffic channel and a control channel after receiving a communication request, the mobile unit comprising:

a phone speaker;

a ringing speaker;

a receiver receiving an incoming call signal via the control channel, and an audio data via the traffic channel;

a switching device coupled to the receiver, configured to receive the audio data and selectively transmit the audio data to the phone speaker and the ringing speaker; and a micro-controller coupled to the switching device, after receiving the incoming call signal, the micro-controller configured to control the switching device to receive the audio data via the audio channel and concurrently transmit the audio data to the ringing speaker before the incoming call is answered, and after receiving a signal for answering the incoming call signal, the micro-controller configured to control the switching device to transmit the audio data to the phone speaker.

2. The mobile unit as claimed in claim 1, wherein the receiver further comprises:

a demodulator configured to receive the audio data via the traffic channel and demodulate the audio data to digital data;

a digital signal processor coupled to the demodulator, configured to process the digital data; and a digital-to-analog converter (DAC) coupled to the digital signal processor, configured to receive and convert output of the digital signal processor to the ring tone.

3. The mobile unit as claimed in claim 1, wherein the receiver further comprises a scratch memory, coupling to the digital signal processor, configured to store the output of the digital signal processor temporarily.

4. The mobile unit as claimed in claim 3, wherein the digital signal processor repeatedly refreshes the digital data in the scratch memory until the signal from a function key is detected.

5. The mobile unit as claimed in claim 3, wherein the digital signal processor erases the digital data of the scratch memory after detecting the signal from a function key.

6. The mobile unit as claimed in claim 1, is a cellular phone.

7. The mobile unit as claimed in claim 1, further comprising:

a function key for generating the signal when the function key is pressed.

8. The mobile unit as claimed in claim 7, wherein the micro-controller transmits a connection signal via a control channel after detecting a press signal from the function key.

9. A method for ring tone output in a wireless telephony network comprising a base station system and a mobile station having a phone speaker and a ringing speaker, the method comprising the steps of:

(a) the base station system allocating a traffic channel and a control channel after receiving a communication request;

(b) receiving an incoming call signal via the control channel for a call connection, and the audio data via the traffic channel from the base station system, wherein the audio data comprises a ring tone at beginning of the call connection;

(c) concurrently outputting the ring tone to the ringing speaker after receiving the incoming call signal from the control channel; and (d) transmitting the audio data to the phone speaker after detecting a press signal from a function key of the mobile station, subsequent to the incoming call signal.

10. The method as claimed in claim 9, wherein the mobile station is a cellular phone.

11. The method as claimed in claim 9, wherein the method further comprises the steps of:
- (e) generating the press signal; and
- (f) transmitting a connection signal to the base station system via a control channel.

12. A method for a ring tone output utilized in a mobile station communicating with a base station, comprising:
- (a) the base station allocating a traffic channel and a control channel after receiving a communication request;
- (b) receiving an incoming call signal for a call connection from the control channel;
- (c) receiving audio data via the traffic channel;
- (d) concurrently acquiring a ring tone from the audio data at beginning of call connection, when the audio data including the ring tone; and
- (e) concurrently transmitting the ring tone to a ringing speaker of the mobile station.

13. The method as claimed in claim 12, wherein the mobile station is a cellular phone.

14. The method as claimed in claim 12, wherein the method further comprises the steps of:
- (f) completing the ring tone transmission after detecting a press signal from a function key of the mobile station, subsequent to the incoming call signal; and
- (g) transmitting a connection signal to a base station system via the control channel.

15. The mobile unit as claimed in claim 1, wherein the audio data transmitting to the ringing speaker is the ring tone.

16. The method as claimed in claim 14 further comprising: (h) transmitting the audio data to a phone speaker after detecting the press signal.

17. The mobile unit as claimed in claim 15, wherein the ring tone is initially stored in a melody database of a base station system.

18. The method as claimed in claim 9, wherein the ring tone is initially stored in a melody database of the base station system.

19. The method as claimed in claim 12, further comprising the steps of:
- the base station acquiring the ring tone from a melody database according to a configuration setting, the ring tone initially storing in the melody database.

* * * * *